United States Patent
Makino et al.

(10) Patent No.: US 7,753,296 B2
(45) Date of Patent: Jul. 13, 2010

(54) PULVERIZATION/CLASSIFICATION APPARATUS FOR MANUFACTURING POWDER, AND METHOD FOR MANUFACTURING POWDER USING THE PULVERIZATION/CLASSIFICATION APPARATUS

(75) Inventors: Nobuyasu Makino, Numazu (JP); Tetsuya Tanaka, Suntoh-Gun (JP); Satoru Miyamoto, Mishima (JP); Shinji Hirata, Suntoh-Gun (JP); Mutsumi Takahashi, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/372,542

(22) Filed: Feb. 17, 2009

(65) Prior Publication Data

US 2009/0159730 A1    Jun. 25, 2009

Related U.S. Application Data

(62) Division of application No. 10/391,898, filed on Mar. 20, 2003, now abandoned.

(30) Foreign Application Priority Data

Mar. 20, 2002    (JP)    ............................. 2002-078325

(51) Int. Cl.
*B02B 1/00*    (2006.01)
*B02C 11/08*    (2006.01)
*B07B 4/00*    (2006.01)

(52) U.S. Cl. .......................................... 241/38; 241/39

(58) Field of Classification Search ...................... 241/5, 241/38, 39
See application file for complete search history.

(56) References Cited

U.S. PATENT DOCUMENTS

| 3,582,002 | A | * | 6/1971 | Langstroth et al. | ............. 241/5 |
| 5,133,504 | A | | 7/1992 | Smith et al. | |
| 5,256,362 | A | * | 10/1993 | Goto et al. | .................... 264/13 |
| 5,538,195 | A | | 7/1996 | Nakazawa et al. | |
| 5,716,751 | A | | 2/1998 | Bertrand et al. | |

(Continued)

FOREIGN PATENT DOCUMENTS

| JP | 02-294660 | 12/1990 |
| JP | 02-294661 | 12/1990 |

(Continued)

*Primary Examiner*—Bena Miller
(74) *Attorney, Agent, or Firm*—Oblon, Spivak, McClelland, Maier & Neustadt, L.L.P.

(57) ABSTRACT

A pulverization/classification apparatus including a cylindrical vessel having an inner wall, on a surface of which a layer including a release agent is located; a pulverizer configured to pulverize a material such as toner raw materials in the cylindrical vessel using a compressed air to prepare a particulate material; and a classifier configured to classify the particulate toner material to prepare a powder of the material. Alternatively, the inner wall of the cylindrical vessel has a circumferentially projected portion. A method for manufacturing a powder such as toners using the pulverization/classification apparatus is also provided.

5 Claims, 5 Drawing Sheets

U.S. PATENT DOCUMENTS

| | | | |
|---|---|---|---|
| 5,862,998 A | 1/1999 | Bogue et al. | |
| 6,300,031 B1 * | 10/2001 | Kato et al. | 430/137.2 |
| 6,745,960 B1 * | 6/2004 | Myo et al. | 241/5 |
| 2003/0134215 A1 | 7/2003 | Kashiwabara et al. | |
| 2004/0079194 A1 | 4/2004 | Nakata et al. | |

FOREIGN PATENT DOCUMENTS

| | | |
|---|---|---|
| JP | 02-294662 | 12/1990 |
| JP | 02-294663 | 12/1990 |
| JP | 4/271853 | 9/1992 |
| JP | 05/146704 | 6/1993 |
| JP | 06-285386 | 10/1994 |
| JP | 8/148317 | 6/1996 |
| JP | 9/106103 | 4/1997 |
| JP | 10/20557 | 1/1998 |
| JP | 10/296115 | 11/1998 |
| JP | 11/33429 | 2/1999 |
| JP | 11-070340 | 3/1999 |
| JP | 2003-38810 | 12/2000 |

* cited by examiner

PULVERIZATION/CLASSIFICATION APPARATUS FOR MANUFACTURING POWDER, AND METHOD FOR MANUFACTURING POWDER USING THE PULVERIZATION/CLASSIFICATION APPARATUS

CROSS-REFERENCE TO RELATED APPLICATIONS

The present application is a divisional of U.S. application Ser. No. 10/391,898 filed Mar. 20, 2003 now abandoned, which is based on Japanese Application No. 2002-078325 filed Mar. 20, 2002. The entire contents of both of which are incorporated herein by reference.

BACKGROUND OF THE INVENTION

1. Field of the Invention

The present invention relates to a fluidized bed type pulverization/classification apparatus for manufacturing a powder and a method for manufacturing a powder using the pulverization/classification apparatus.

Particularly, the present invention relates to a fluidized bed type pulverization/classification apparatus for pulverizing and classifying a toner constituent mixture which includes at least a binder resin and a colorant and which has been subjected to melt-kneading, cooling and crushing treatments, to prepare a toner having a relatively small particle diameter. In addition, the present invention also relates to a method for manufacturing a toner having a relatively small particle diameter using the fluidized bed type pulverization/classification apparatus.

2. Discussion of the Background

Conventional fluidized bed type pulverization/classification apparatuses typically have a cylindrical shape and include a vessel. In addition, plural air nozzles are provided on the lower portions of the inner wall of the vessel to discharge a high pressure jet air. In the cylindrical vessel, particles of a toner raw material (i.e., a toner constituent mixture) are suspended by the high pressure jet air so as to be collided to each other. In order to efficiently perform pulverization while preventing excessive pulverization, the pulverized toner raw material needs to be rapidly fed to a classifier so that the toner particles have a small particle diameter in a proper diameter range.

FIG. 1 illustrates a conventional fluidized bed type pulverization/classification apparatus which includes a pulverizer and a classifier.

Referring to FIG. 1, particles 2 (hereinafter referred to as raw material particles 2) of a toner raw material which are fed from a raw material feeder 7 into a cylindrical vessel 1 are accelerated by high pressure jet air fed by an air feeder 6 and discharged from plural air nozzles 3. The raw material particles 2 collide with each other at a crossing point of the jet air streams, resulting in pulverization of the particles 2. The raw material particles 2 stay in the cylindrical vessel 1 for a predetermined time while circling therein. After the pulverization is repeated, the pulverized raw material particles 2 are fed by upward current to a classification rotor 4 of the classifier, which is provided on an upper portion of the cylindrical vessel 1, so as to be classified into particles having a particle diameter in a proper particle diameter range and coarse particles (fine particles are discharged using a blower). The particles having a particle diameter in a proper diameter range are used as a toner which is a final product. The coarse particles are fed again to the cylindrical vessel 1 to be further subjected to the pulverization treatment. By repeating these operations, the raw material particles 2 are converted to the final toner product.

Various pulverization methods using a cylindrical vessel have been proposed in attempting to solve various problems.

Unexamined Japanese Patent Application No. (hereinafter referred to as JP-A) 05-146704 discloses a method in which the feeding quantity of raw material particles is controlled in attempting to avoid variation in the classification accuracy.

JP-A 06-285386 discloses a device which can measure the concentration of particles in the air in a pulverizer in attempting to easily operate the pulverizer.

JP-A 11-70340 discloses a technique of minimizing turbulence loss in a vessel caused by air flow and raw material particles, which have different flow rates.

In addition, JP-As 2-294660, 2-294661, 2-294662 and 2-294663 disclose methods for manufacturing a toner having a general particle diameter using a pulverization/classification method in which a first classifier and a second classifier are used as a classifier. When a classification operation is performed for a long period of time using such a pulverizer, soft resin components included in toner constituents tends to adhere to a particle discharging tube of the second classifier etc., resulting in formation of coarse toner particles, and thereby the coarse toner particles are included in the resultant final toner product. In attempting to avoid adhesion of such soft resin components, the applications disclose a method which uses a particle discharging tube, at least a part of which is made of a fluorine-containing resin.

Recently, there is a desire for high resolution images in electrophotography. Therefore, a strong need exists for a toner having a small particle diameter. Namely, a need exists for a toner having a small weight average particle diameter of from about 4.5 μm to 8.0 μm.

In such a case, when the particle diameter of pulverized raw material particles is small, the state of the pulverized raw material particles in a pulverizer is different from that in the conventional toner case. Therefore it is necessary to change the operation conditions of the pulverizer used.

Provided that the true specific gravity of toner raw material particles is 1.2 and the particle diameter of the particles changes from 9.0 μm to 7.5 μm and 6.0 μm, the number of the particles increases from 2.7 billion pieces per gram to 4.7 billion and 9.3 billion pieces per gram, respectively. In this case, if the powder concentration is 0.05% in a pulverizer, the center distance of the particles decreases from 90 μm to 75 μm and 60 μm, respectively. In addition, the Brownian motion of the particles changes from 2 μm/sec to 2.52 μm/sec and 3 μm/sec, respectively.

When a toner powder having such a small particle diameter is manufactured using a fluidized bed type pulverization/classification method, the following problems tend to occur:

(1) The pulverization ability of the pulverizer used deteriorates;

(2) coarse particles (having a particle diameter not less than about 16 μm) are included in the final toner product; and (3) the content of super fine particles (having a particle diameter not greater than about 4 μm) in the final toner product increases.

The content of such coarse particles and super fine particles in the final toner product prepared by conventional fluidized bed pulverization/classification methods is considerably high.

When the content of super fine particles in a pulverized product increases, aggregates thereof tend to be formed. In this case, aggregates are considered to be coarse particles and therefore are re-used, resulting in increase of fine particles, and thereby the image qualities deteriorate. In order to avoid such a problem, classification is severely performed such that the classification particle range is narrowed. In this case, another problem occurs in that the yield of a final toner product having a particle diameter in a desired range seriously decreases. In addition, a developer including super fine particles and coarse particles in a large amount does not have a stable charge quantity, and thereby the resultant images have a low image density.

Namely, inclusion of super fine particles and coarse particles in a toner in a large amount affects the charge quantity of the toner. When raw materials are excessively pulverized in attempting to avoid inclusion of coarse particles in a toner, the resultant toner images have a background fouling problem, resulting in deterioration of image qualities. To the contrary, an insufficiently pulverized toner causes a poor image transfer problem, also resulting in deterioration of image qualities.

Such problems specific to a toner having a small particle diameter and manufacturing problems thereof are newly recognized problems, and therefore a solution thereof has not yet been proposed.

Because of these reasons, a need exists for a method and apparatus capable of producing an electrophotographic toner having a small particle diameter in which super fine particles and coarse particles are included in a relatively small amount and which has a stable charge quantity and can produce high resolution images.

SUMMARY OF THE INVENTION

Accordingly, an object of the present invention is to provide a pulverization/classification method and apparatus capable of producing an electrophotographic toner having a small particle diameter in which super fine particles and coarse particles are included in a relatively small amount and which has a stable charge quantity and can produce high resolution images.

Another object of the present invention is to provide a pulverization/classification apparatus and method, by which such a toner as mentioned above can be produced highly efficiently at a low cost.

Briefly these objects and other objects of the present invention as hereinafter will become more readily apparent can be attained by a pulverization/classification apparatus including:

a cylindrical vessel having an inner wall, wherein a layer including a release agent is formed on at least a surface of the inner wall;

a pulverizer configured to pulverize a material (e.g., a toner raw material) in the cylindrical vessel using a compressed air to prepare a particulate material (a particulate toner raw material); and a classifier configured to classify the particulate material to prepare a powder (a toner) having a predetermined average particle diameter.

Alternatively, the inner wall of the cylindrical vessel has a circumferentially projected portion. It is preferable that the cylindrical vessel satisfies the following relationship:

$$A/2 \leq B \leq 9A/10$$

wherein A represents the inside cross sectional area of the cylindrical vessel other than the circumferentially projected portion when the cylindrical vessel is cut at a plane vertical to the center axis thereof, and B represents the inside cross sectional area of the cylindrical vessel at the top of the circumferentially projected portion.

It is also preferable that cylindrical vessel satisfies the following relationship:

$$H/10 \leq QR \leq 5H/10$$

wherein H represents the length of the cylindrical vessel in the vertical direction and QR represents the length of the circumferentially projected portion in the vertical direction.

It is preferable that the cylindrical vessel satisfies the following relationship:

$$H/10 \leq Ph \leq 8H/10$$

wherein H represents the length of the cylindrical vessel in the vertical direction and Ph represents the height of the projected portion in the horizontal direction.

At least the surface of the circumferentially projected portion is preferably treated with an electroconductive release agent.

The classifier includes a classification rotor having a blade and a driving member each having a fixed portion, wherein the fixed portion of the blade and the driving member is preferably treated with an electroconductive release agent, to prevent adhesion, aggregation, melt-adhesion and fixation of the particulate (toner raw) material thereon.

The compressed air preferably has a dew point of from $-10°$ C. to $-40°$ C., to prevent adhesion, aggregation, melt-adhesion and fixation of the particulate (toner raw) material on the pulverization/classification apparatus.

In another aspect of the present invention, a method for manufacturing a toner is provided which includes:

feeding a material (e.g., a toner raw material) in a cylindrical vessel of a pulverization/classification apparatus including a pulverizer and a classifier;

pulverizing the material (the toner raw material) with the pulverizer to prepare a particulate material (a particulate toner raw material); and classifying the particulate (toner raw) material with the classifier to prepare a powder (a toner powder), wherein the pulverization/classification apparatus is the pulverization/classification apparatus mentioned above.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
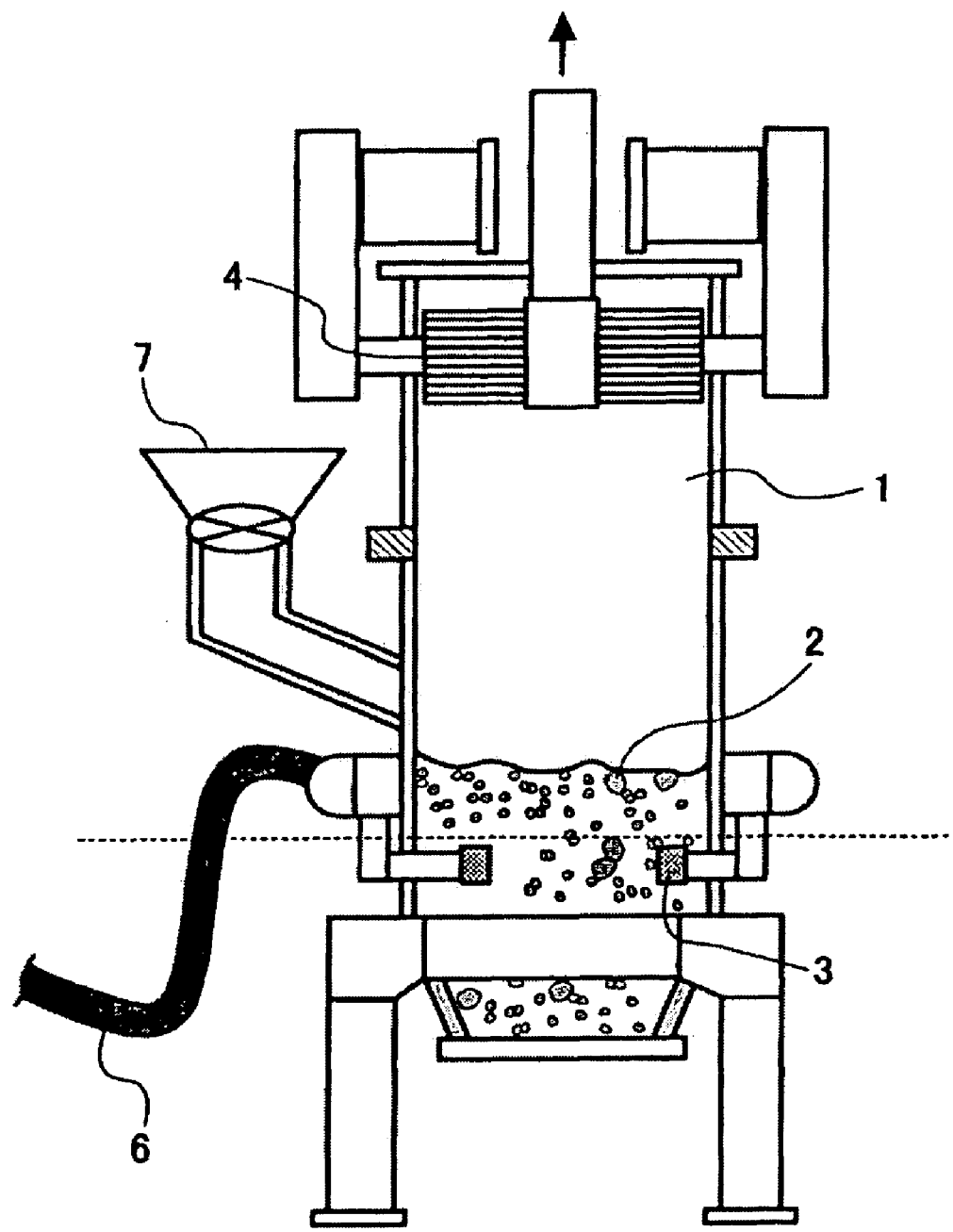
FIG. 1 is a cross sectional view of a conventional pulverization/classification apparatus having a cylindrical vessel.

Hereinafter, the present invention will be explained referring to a pulverization/classification apparatus and method for manufacturing a toner, but the present invention is not limited to the pulverization/classification apparatus and method.

The present inventors have investigated why such problems occur when a toner having a small particle diameter is prepared, i.e., to determine the factors of the problems.

As mentioned above, in fluidized bed type pulverization/classification methods the particulate toner raw material which is prepared by pulverizing a toner raw material is classified by a classification rotor and then coarse particles produced in the classification are reused in the pulverization process. By repeating this recycling process several times, a toner having a small particle diameter is prepared. As a result, it is found that an excessive amount of super fine toner particles are present in the resultant toner (i.e., pulverization is excessively performed).

In addition, when the recycling process is repeated, a phenomenon in that the pulverized toner raw material is adhered, accumulated and fixed on the inner wall of the pulverizer often occurs, and finally the accumulated toner raw material breaks and falls in the pulverizer.

When the breaking/falling repeatedly occurs, the concentration of the pulverized toner raw material in the pulverizer and classifier greatly changes, and thereby it becomes impossible to stably perform a pulverization operation. In addition, the classification ability of the classifier used is deteriorated, and thereby not only coarse particles but also aggregated super fine particles remain without being classified, resulting in inclusion of the coarse particles and aggregated super fine particles in the resultant final toner product.

In general, the smaller particle diameter a powder has, the higher aggregation property the powder has, and thereby the powder has poor fluidity. As a result thereof, the particles of the powder are adhered, accumulated and fixed on the inner wall of a pulverizer.

It is well known that when the particle diameter of particles decreases (i.e., the concentration thereof in the air increases), and the distance between the particles decreases, there is a great possibility that the particles cause association-aggregation.

As a result of the above-mentioned investigation, it is considered that the problems can be solved if the adhesion, aggregation, melt-adhesion and fixation of the toner raw material particles in the pulverizer can be suppressed. Therefore, the present inventors have investigated the materials and constitutions of the pulverizer in attempting to solve the problems. As a result of the investigation, it is found that the above-mentioned problems can be solved by one of the two techniques mentioned below (i.e., the present invention).

One of the two techniques, which is discovered from the investigation concerning the material of the pulverizer, is a pulverization/classification apparatus which includes:

a cylindrical vessel having an inner wall, wherein a layer including a release agent is formed on a surface of the inner wall;

a pulverizer configured to pulverize a toner raw material in the cylindrical vessel using a compressed air to prepare a particulate toner raw material; and a classifier configured to classify the particulate toner raw material to prepare a toner powder having a predetermined average particle diameter.

By forming such a layer on the inner wall of the cylindrical vessel, at least one of adhesion, aggregation, melt-adhesion and fixation of super fine particles on the inner wall of the cylindrical vessel can be prevented.

Figure 2:
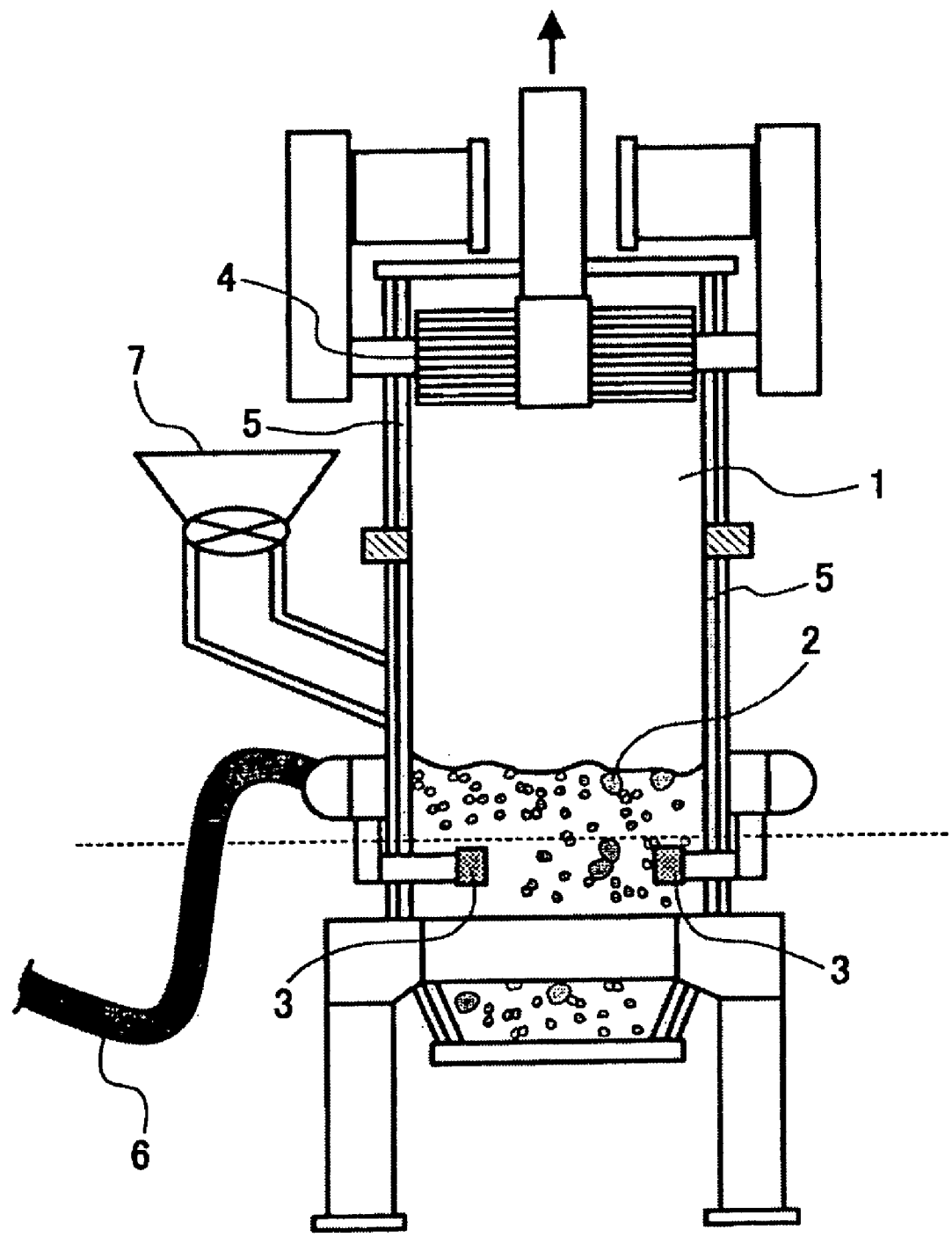
FIG. 2 is a cross sectional view of an embodiment of the fluidized bed type pulverization/classification apparatus of the present invention.

FIG. 2 is a schematic view illustrating an embodiment of the fluidized bed type pulverization/classification apparatus of the present invention.

In FIG. 2, a release layer 5 including a release agent is formed on entire the surface of the inner wall of the cylindrical vessel 1. However, it is not necessary to form a release layer on entire the surface of the inner wall, and it is possible to form a release layer on a part of the surface of the inner wall.

Specific examples of the release agents for use in the present invention include silicone resins, and fluorine-containing resins. Among these resins, fluorine-containing resins are preferably used in view of the materials used in the toner and toner properties such as particle diameter. The release agents for use in the present invention preferably have such a resistance property that a volume resistivity thereof is from $10^3$ to $10^{16}$ Ω·cm. Among the fluorine-containing resins, PTFE (polytetrafluoroethylene type fluorine-containing resins), PFA (tetrafluoroethylene-perfluoroalkyl vinyl ether copolymers), FEP (tetrafluoroethylene-hexafluoropropylene copolymers) and ETFE (tetrafluoroethylene-ethylene copolymers), which have a volume resistivity of from $10^3$ to $10^9$ Ω·cm, are preferably used. It is preferable to form a layer made of such fluorine-containing resins on the inner wall of the cylindrical vessel, for example, by coating.

The material for use as the cylindrical vessel is typically a stainless steel (e.g., SUS) and a steel (e.g., SS).

Figure 4:
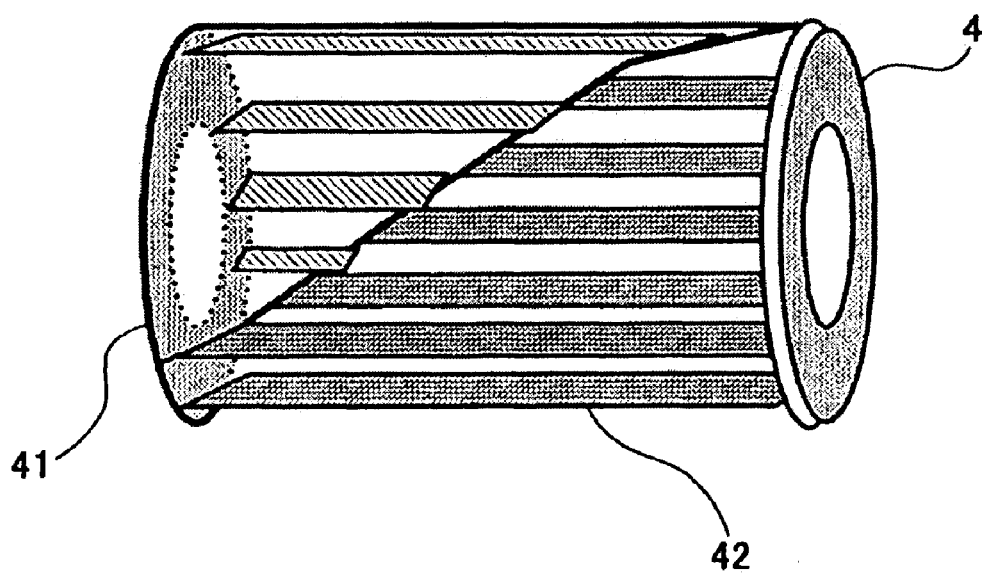
FIG. 4 is a schematic view illustrating classification rotor for use in the fluidized bed type pulverization/classification apparatus of the present invention.

The classifier of the fluidized bed type pulverization/classification apparatus of the present invention includes a classification rotor as a classifying device. The classification rotor has a blade and a driving member. FIG. 4 is a schematic view illustrating a classification rotor for use in the fluidized bed type pulverization/classification apparatus of the present invention. Numerals 4, 41 and 42 denote a classification rotor, a fixed portion of a driving member, and a fixed portion of a blade, respectively. By subjecting the fixed portions of the blade and driving member to a treatment using a release agent, at least one of adhesion, aggregation, melt-adhesion and fixation of the powder, which passes through the classification rotor, on the fixed portions of the blade and driving member can be avoided.

The second technique, which is discovered from the investigation concerning the constitution of the pulverizer, is a pulverization/classification apparatus including:

a cylindrical vessel having an inner wall, wherein the inner wall has a circumferentially projected portion;

a pulverizer configured to pulverize a toner raw material in the cylindrical vessel using a compressed air to prepare a particulate toner raw material; and a classifier configured to classify the particulate toner raw material to prepare a toner powder.

The circumferentially projected portion will be explained referring to FIG. 3. As can be understood from FIG. 3, a circumferentially projected portion 8 is a circumferential projection in which a part of the inner wall of the cylindrical vessel extends toward the center axis of the cylindrical vessel. The length (i.e., the thickness) of the circumferentially projected portion 8 in the vertical direction decreases in the direction of from the surface of the inner wall of the cylindrical vessel to the center axis of the cylindrical vessel. The circumferentially projected portion is continuously formed on a surface of the inner wall of the cylindrical vessel.

By forming such a projected portion in the inner wall of the cylindrical vessel, the speed of the powder in the vessel increases when passing through the projected portion, thereby, the airflow (i.e., the behavior of the powder) in the cylindrical vessel is changed. Therefore, the self-cleaning ability of the cylindrical vessel is increased, and it becomes impossible for super fine particles to adhere to the inner wall. Thus, the problem to be solved in the present invention can be solved.

Figure 3A:
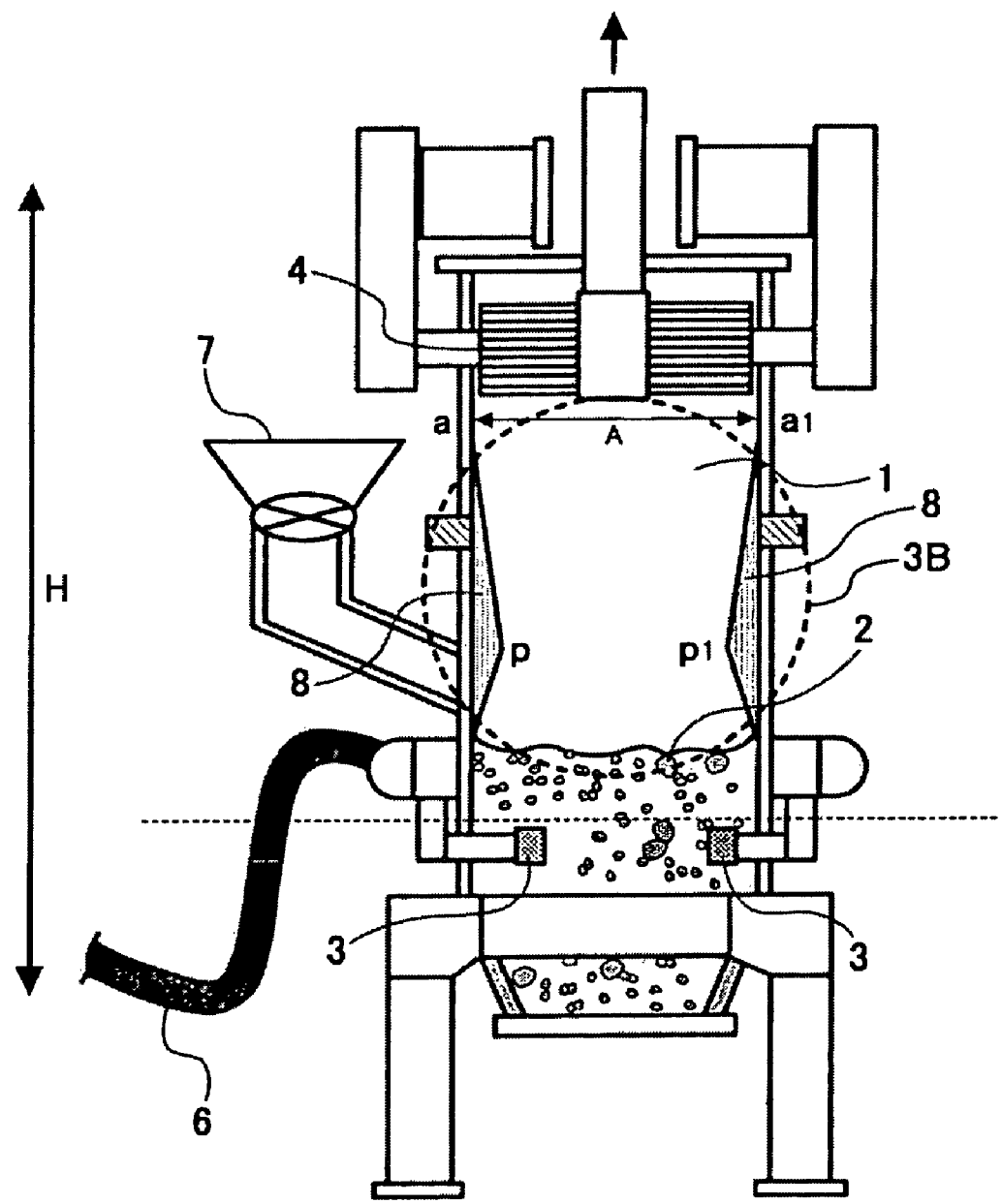
FIG. 3 is a cross sectional view of another embodiment of the fluidized bed type pulverization/classification apparatus of the present invention.
Figure 3B:
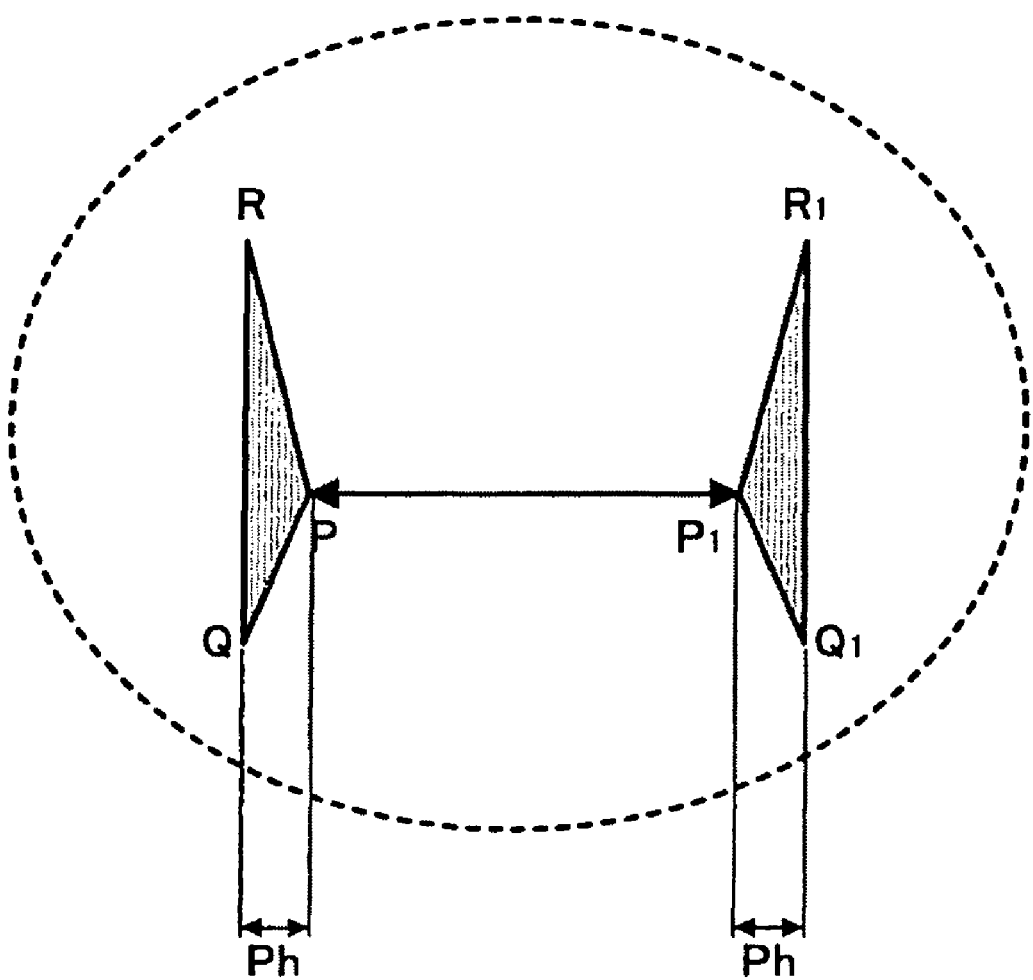

In FIG. 3, triangles PQR and $P_1Q_1R_1$ represent the cross section of the circumferentially projected portion 8. The triangles PQR and $P_1Q_1R_1$ have almost the same shape, and the points P and $P_1$ (and Q and $Q_1$, and R and $R_1$) are symmetrically located relative to the center axis of the cylindrical vessel. When the cylindrical vessel is cut by any vertical plane including the center axis thereof, the cross section of the projected portion has the same triangle form. In FIG. 3, the cross section has a triangle form, but the form is not limited to a triangle. For example, the point P ($P_1$) may have a round shape, although the point P ($P_1$) preferably has a sharp edge.

When the projected portion satisfies the conditions mentioned below, the adhesion of the super fine particles on the inner wall during the pulverization/classification process can be effectively prevented.

First Condition $$A/2 \leq B \leq 9A/10 \quad \text{Formula (1)}$$

wherein A represents the inside cross sectional area of the cylindrical vessel other than the projected portion, i.e., the area of the circle having a diameter of $a-a_1$ (as illustrated in FIG. 3), and B represents the inside cross sectional area of the projected portion, i.e., the area of the circle having a diameter of $P-P_1$ (as illustrated in FIG. 3).

Second Condition $$H/10 \leq QR(=Q_1R_1) \leq 5H/10 \quad \text{Formula (2)}$$

wherein H represents the total length of the vessel in the vertical direction (as illustrated in FIG. 3), and QR represents the length of the base QR (or $Q_1R_1$) of the triangle PQR (or $P_1Q_1R_1$).

Third Condition $$H/10 \leq Ph(=\{(a-a_1)-(P-P_1)\}/2) \leq 8H/10 \quad \text{Formula (3)}$$

wherein H represents the total length of the vessel in the vertical direction (as illustrated in FIG. 3), and Ph represents the height of the projected portion (i.e., $\{(a-a_1)-(P-P_1)\}/2$).

It is preferable for the cylindrical vessel type pulverization/classification apparatus to satisfy the three conditions mentioned above. In particular, when the third condition is satisfied, the resultant pulverization/classification apparatus has advantages in that the pulverized particles from which coarse particles are removed can be effectively collected by a cyclone; the particles can be well fluidized in the vessel; and the speed of the particles fed to the classification rotor located on an upper portion of the vessel can be controlled at the same time.

By pulverizing and classifying a toner raw material using the above-mentioned fluidized bed type pulverization/classification apparatus of the present invention, the resultant toner includes a very small amount of super fine particles and coarse particles therein. Therefore, the resultant toner has a stable charge quantity while having a small particle diameter, and thereby high resolution toner images can be produced.

When a toner raw material is pulverized and classified using the above-mentioned fluidized bed type pulverization/classification apparatus of the present invention, it is preferable that the compressed air has a dew point of from –10° C. to –40° C. This is because the air in the vessel hardly includes moisture, resulting in decrease of the capillary force of the pulverized particles, and thereby the adhesion, aggregation, melt-adhesion and fixation of the particles on the pulverization/classification apparatus can be prevented.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Preparation of Fluidizing Vessel Type Pulverization/Classification Apparatus

A fluidized bed type pulverization/classification apparatus of the present invention having a cylindrical vessel whose inner wall had been coated with a tetrafluoroethylene-hexafluoropropylene copolymer (FEP) having a volume resistivity of $10^6$ Ω·cm was prepared.

Preparation of Toner Raw Material

The following components were mixed.

| Polyester resin | 75% by weight |
|---|---|
| Styrene-acrylic copolymer | 10% by weight |
| Carbon black | 15% by weight |

The mixture was melt-kneaded using a roll mill, and then cooled to be solidified. The solidified mixture was crushed with a hammer mill to prepare a toner raw material.

Preparation of Toner

Five hundred (500) kilograms of the toner raw material were supplied to the above-prepared fluidizing vessel type pulverization/classification apparatus to be subjected to pulverization and classification treatments.

As a result, a toner having a weight average particle diameter of 6.5 μm, a super fine particle content of 48% by population on a number average basis (i.e., including super fine particles having a particle diameter not greater than 4 μm in an amount of 48% by population (i.e., by number)) and a coarse particle content of 0.03% by volume on a weight average basis (i.e., including coarse particles having a particle diameter not less than 16 μm in an amount of 0.03% by volume) was prepared. The particle diameter, super fine particle content and coarse particle content were measured using a MULTICIZER manufactured by Coulter Electronics, Inc.

The pulverization ability of the pulverization/classification apparatus was 50 g/m³/min (i.e., the weight of the toner product is 50 grams relative to the airflow (m³/min), the units are hereinafter referred to as simply "g"). When the inner wall of the cylindrical vessel was observed after the pulverization treatment, the toner raw material formed a layer having a thickness of 1.5 mm on the inner wall of the vessel, but there were no aggregated particles in the layer.

Comparative Example 1

The procedure for preparation of the toner in Example 1 was repeated except that the pulverization/classification apparatus was changed to a conventional pulverization/classification apparatus as illustrated in FIG. 1, which has a cylindrical vessel made of a stainless steel SUS303, and the weight of the toner raw material was 300 kg.

As a result, the pulverization ability of the pulverization/classification apparatus decreased to 40 g after the toner raw material of 300 kg was pulverized, the toner raw material formed a layer having a thickness of 30 mm on the inner wall of the vessel, and aggregations were observed in the layer.

Example 2

Preparation of Fluidizing Vessel Type Pulverization/Classification Apparatus

A fluidizing vessel type pulverization/classification apparatus of the present invention having a cylindrical vessel, which has a constitution as illustrated in FIG. 3, was prepared. In this case, the following condition was satisfied:

$$B=8A/10.$$

Namely, the first condition ($A/2 \leqq B \leqq 9A/10$) mentioned above was satisfied.

Preparation of Toner

The procedure for preparation of the toner in Example 1 was repeated except that the pulverization/classification apparatus was changed to the above-prepared pulverization/classification apparatus.

As a result, a toner having a weight average particle diameter of 6.3 μm, a super fine particle content of 48% by population on a number average basis and a coarse particle content of 0.03% by volume on a weight average basis was prepared.

The pulverization ability of the pulverization/classification apparatus was 50 g. When the inner wall of the cylindrical vessel was observed after the pulverization treatment, the toner raw material formed a layer having a thickness of 3 mm on the inner wall of the vessel, but there were no aggregated particles in the layer.

Example 3

Preparation of Fluidizing Vessel Type Pulverization/Classification Apparatus

A fluidizing vessel type pulverization/classification apparatus of the present invention having a cylindrical vessel, which has a constitution as illustrated in FIG. 3, was prepared. In this case, the following condition was satisfied:

$$QR=4H/10.$$

Namely, the second condition ($H/10 \leqq QR \leqq 5H/10$) mentioned above was satisfied.

Preparation of Toner

The procedure for preparation of the toner in Example 1 was repeated except that the pulverization/classification apparatus was changed to the above-prepared pulverization/classification apparatus.

As a result, a toner having a weight average particle diameter of 6.25 μm, a super fine particle content of 47% by population on a number average basis and a coarse particle content of 0.02% by volume on a weight average basis was prepared.

The pulverization ability of the pulverization/classification apparatus was 55 g. When the inner wall of the cylindrical vessel was observed after the pulverization treatment, the toner raw material formed a layer having a thickness of 3 mm on the inner wall of the vessel, but there were no aggregated particles in the layer.

Example 4

Preparation of Fluidizing Vessel Type Pulverization/Classification Apparatus

A fluidizing vessel type pulverization/classification apparatus of the present invention having a cylindrical vessel, which has a constitution as illustrated in FIG. 3, was prepared. In this case, the following condition was satisfied:

$$Ph=4H/10.$$

Namely, the third condition ($H/10 \leqq Ph \leqq 8H/10$) mentioned above was satisfied.

Preparation of Toner

The procedure for preparation of the toner in Example 1 was repeated except that the pulverization/classification apparatus was changed to the above-prepared pulverization/classification apparatus.

As a result, a toner having a weight average particle diameter of 6.20 μm, a super fine particle content of 47% by population on a number average basis and a coarse particle content of 0.01% by volume on a weight average basis was prepared.

The pulverization ability of the pulverization/classification apparatus was 60 g. When the inner wall of the cylindrical vessel was observed after the pulverization treatment, the toner raw material formed a layer having a thickness of 2.5 mm on the inner wall of the vessel, but there were no aggregated particles in the layer.

Example 5

Preparation of Fluidizing Vessel Type Pulverization/Classification Apparatus

A fluidized bed type pulverization/classification apparatus of the present invention having a cylindrical vessel which has a constitution as illustrated in FIG. 3 and satisfies the third condition ($H/10 \leqq Ph \leqq 8H/10$) and whose inner surface had been coated with a tetrafluoroethylene-hexafluoropropylene copolymer (FEP) having a volume resistivity of $10^6$ Ω·cm was prepared.

Preparation of Toner

The procedure for preparation of the toner in Example 1 was repeated except that the fluidized bed type pulverization/classification apparatus was changed to the above-prepared apparatus.

As a result, a toner having a weight average particle diameter of 6.5 μm, a super fine particle content of 48% by population on a number average basis and a coarse particle content of 0.03% by volume on a weight average basis was prepared.

The pulverization ability of the pulverization/classification apparatus was 65 g. When the inner wall of the cylindrical vessel was observed after the pulverization treatment, the toner raw material formed a layer having a thickness of 1 mm on the inner wall of the vessel, but there were no aggregated particles in the layer.

Example 6

Preparation of Fluidizing Vessel Type Pulverization/Classification Apparatus

The procedure for preparation of the fluidizing vessel type pulverization/classification apparatus in Example 1 was repeated except that the fixed portion of the blade and driving member of the classification rotor were coated with a FEP having a volume resistivity of $10^6$ Ω·cm.

Preparation of Toner

The procedure for preparation of the toner in Example 1 was repeated except that the fluidized bed type pulverization/classification apparatus was changed to the above-prepared apparatus.

As a result, a toner having a weight average particle diameter of 6.2 μm, a super fine particle content of 47% by population on a number average basis and a coarse particle content of 0.01% by volume on a weight average basis was prepared.

The pulverization ability of the pulverization/classification apparatus was 65 g. When the inner wall of the cylindrical vessel was observed after the pulverization treatment, the toner raw material formed a layer having a thickness of 1.5 mm on the inner wall of the vessel, but there were no aggregated particles in the layer.

In addition, when 500 kg of the toner raw material were further subjected to the pulverization and classification treatment.

As a result, a toner having a weight average particle diameter of 6.2 μm, a super fine particle content of 47% by population on a number average basis and a coarse particle content of 0.01% by volume on a weight average basis was prepared.

The pulverization ability of the pulverization/classification apparatus was 65 g. When the inner wall of the cylindrical vessel was observed after the pulverization treatment, the toner raw material formed a layer having a thickness of 1.5 mm on the inner wall of the vessel, but there were no aggregated particles in the layer.

Example 7

Preparation of Toner

The procedure for preparation of the toner in Example 5 was repeated except that the pulverization was performed using a compressed air having a dew point of −20° C.

As a result, a toner having a weight average particle diameter of 6.1 μm, a super fine particle content of 47% by population on a number average basis and a coarse particle content of 0.02% by volume on a weight average basis was prepared.

The pulverization ability of the pulverization/classification apparatus was 65 g. When the inner wall of the cylindrical vessel was observed after the pulverization treatment, the toner raw material formed a layer having a thickness of 1.5 mm on the inner wall of the vessel, but there were no aggregated particles in the layer.

In addition, when 500 kg of the toner raw material were further subjected to the pulverization and classification treatment.

As a result, a toner having a weight average particle diameter of 6.1 μm, a super fine particle content of 47% by population on a number average basis and a coarse particle content of 0.01% by volume on a weight average basis was prepared.

The pulverization ability of the pulverization/classification apparatus was 70 g. When the inner wall of the cylindrical vessel was observed after the pulverization treatment, the toner raw material formed a layer having a thickness of 1.5 mm on the inner wall of the vessel, but there were no aggregated particles in the layer.

Effect of the Invention

As mentioned above, by using the fluidized bed type pulverization/classification apparatus of the present invention, a toner having a fine particle diameter and hardly including aggregated particles can be stably produced without adhering to the inside of the apparatus.

In addition, by using the pulverization/classification apparatus of the present invention satisfying one or more of the specific conditions, the convection speed in the cylindrical vessel can be increased, resulting in stable production of a toner having a small particle diameter with hardly causing the adhesion and aggregation problems.

Further, by using the pulverization/classification apparatus of the present invention in which the fixed portion of the classification rotor and driving member of the classifier is coated with an electroconductive release agent, the pulverized toner hardly adheres to the inside or outside of the classifier, and thereby the resultant toner has a stable particle diameter distribution because classification is stably performed.

By using a compressed air having a dew point of from −10° C. to −40° C., the adhesion and aggregation problems can be prevented because the capillary force of the powder can be reduced, resulting in stable preparation of a toner having a small particle diameter.

In addition, by using the pulverization/classification apparatus of the present invention, a toner which has a small particle diameter and which can produce high resolution images without causing background fouling and poor toner transfer problems can be efficiently produced at a low cost.

Having now fully described the invention, it will be apparent to one of ordinary skill in the art that many changes and modifications can be made thereto without departing from the spirit and scope of the invention as set forth therein.

What is claimed is:

1. A pulverization/classification apparatus comprising:
a cylindrical vessel having an inner wall, wherein the inner wall comprises a circumferentially projected portion;
a pulverizer configured to pulverize a material disposed in the cylindrical vessel using a compressed air to prepare a particulate material; and
a classifier configured to classify the particulate toner raw material to prepare a powder of the material having a predetermined average particle diameter,
wherein the cylindrical vessel satisfies the following relationship:

$$A/2 \leq B < 9A/10$$

wherein A is equal to an inside cross sectional area of the cylindrical vessel other than the circumferentially projected portion, and B is equal to an inside cross sectional area of the cylindrical vessel at the circumferentially projected portion.

2. The pulverization/classification apparatus according to claim 1, wherein the circumferentially projected portion further comprises a layer including an electroconductive release agent on a surface thereof.

3. A pulverization/classification apparatus comprising:
a cylindrical vessel having an inner wall, wherein the inner wall comprises a circumferentially projected portion;
a pulverizer configured to pulverize a material disposed in the cylindrical vessel using a compressed air to prepare a particulate material; and
a classifier configured to classify the particulate toner raw material to prepare a powder of the material having a predetermined average particle diameter,
wherein the cylindrical vessel satisfies the following relationship:

$$H/10 \leq QR \leq 5H/10$$

wherein H is equal to a length of the cylindrical vessel in a vertical direction and QR is equal to a length of the circumferentially projected portion in the vertical direction.

4. The pulverization/classification apparatus according to claim 3, wherein the circumferentially projected portion further comprises a layer including an electroconductive release agent on a surface thereof.

5. A pulverization/classification apparatus comprising:
a cylindrical vessel having an inner wall, wherein the inner wall comprises a circumferentially projected portion;
a pulverizer configured to pulverize a material disposed in the cylindrical vessel using a compressed air to prepare a particulate material; and
a classifier configured to classify the particulate toner raw material to prepare a powder of the material having a predetermined average particle diameter,
wherein the cylindrical vessel satisfies the following relationship:

$$H/10 \leq Ph \leq 8H/10$$

wherein H is equal to a length of the cylindrical vessel in a vertical direction and Ph is equal to a height of the circumferentially projected portion in a horizontal direction that is about perpendicular to the vertical direction.

* * * * *